(12) United States Patent
Hou

(10) Patent No.: US 6,781,942 B2
(45) Date of Patent: Aug. 24, 2004

(54) LOWER INERTIA COMPACT DISK DRIVING DEVICE WITH FOCUSING DEVICE

(76) Inventor: Chien-Tzu Hou, 38881 Garibaldi Common, Fremont, CA (US) 94536

( * ) Notice: Subject to any disclaimer, the term of this patent is extended or adjusted under 35 U.S.C. 154(b) by 276 days.

(21) Appl. No.: 10/057,933

(22) Filed: Jan. 29, 2002

(65) Prior Publication Data

US 2003/0142612 A1 Jul. 31, 2003

(51) Int. Cl.⁷ .......................... G11B 7/00; G11B 7/135; G11B 3/00; G11B 17/00; G11B 21/16
(52) U.S. Cl. .................. 369/112.01; 369/177; 369/244
(58) Field of Search .............................. 369/177, 244, 369/112.01, 249, 251, 254, 215, 176, 100, 99, 222, 53.23, 53.28, 44.14, 44.11; 720/662, 663, 664, 683

(56) References Cited

U.S. PATENT DOCUMENTS 3,193,295 A * 7/1965 Shinichi Isemura ......... 369/177
5,894,460 A * 4/1999 Yanagawa et al. ......... 369/13.37
6,504,813 B2 * 1/2003 Suzuki et al. ............... 720/683

* cited by examiner

Primary Examiner—Julie Anne Watko
(74) Attorney, Agent, or Firm—Pro-Techtor International Services

(57) ABSTRACT

A lower inertial compact disk driving device is disclosed. The disk and laser head are static and optical unit device are used as a medium of the laser optical path. Furthermore, the focusing is realized. An optical unit device is used as a medium of the laser beam and a displacing device is used to change the position of the optical unit device. The focusing device has two rigid sliding tracks, one focus coil, and two permanent magnets. The rigid sliding tracks are used as a linkage. The focusing error from the laser beam passing through the optical unit device is converted into a focusing driving voltage which is applied to the focus coil so that a magnetic field is generated. This field is interacted with permanent magnets so that the focus coil moves up and down. Thereby, the rigid sliding tracks move up and down to drive the optical unit device to move.

13 Claims, 5 Drawing Sheets

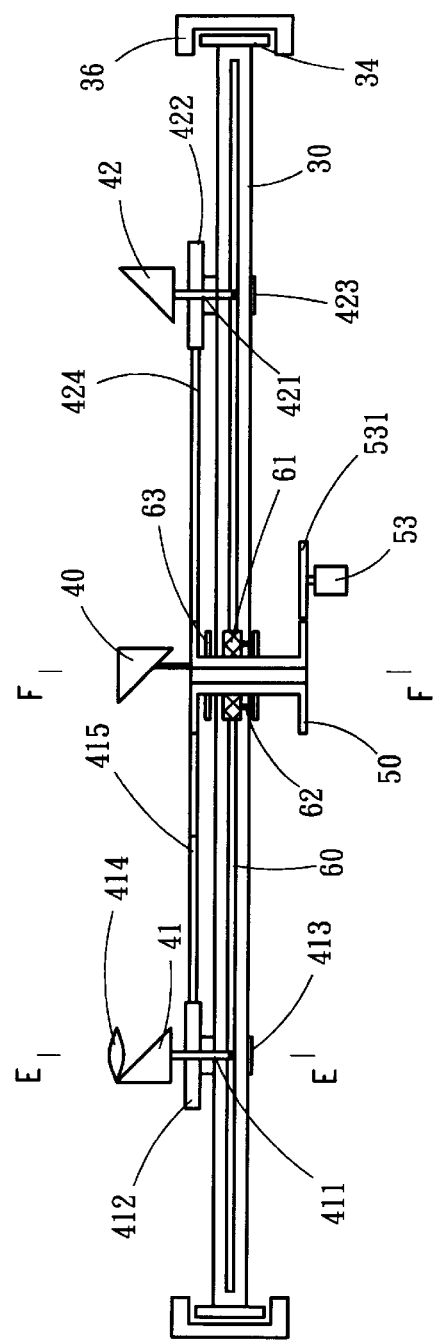
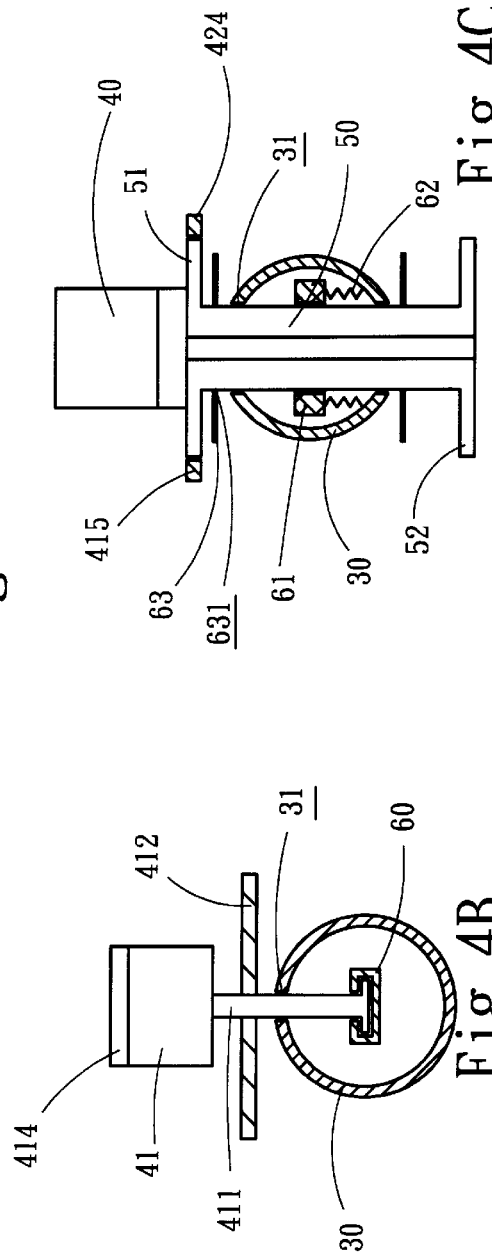
Fig. 4A
Fig. 4B
Fig. 4C

LOWER INERTIA COMPACT DISK DRIVING DEVICE WITH FOCUSING DEVICE

BACKGROUND OF THE INVENTION

1. Field of the Invention

The present invention relates to a lower inertial compact disk driving device, and particularly to a lower inertial compact disk driving device, wherein an optical unit device is used as a medium of the laser beam and a displacing device is used to change the position of the optical unit device, thereby, light spots are located on a focusing device of a disk precisely.

2. Description of the Prior Art

In the current compact disk driving device, the disk rotates and the laser head make a straight and reciprocal movement. The prior technic lower speed compact disk drive uses a constant linear velocity (CLV) or constant angular velocity (CAV). The laser head has the constant speed as reading data. Another conventional way is used to increase the reading speed by increasing the rotation speed. Some current compact disk drive and DVD ROM use "True X" multi-beam technology, which is used to assure the reading in the whole disk has the same speed. The speed changes only when the mass of the compact disk and the operation system are different.

The technologies for reading DVD are not the same in different kinds of compact disk drives. In the prior art, to be compatible with the common CD ROM, the DVD ROM use two heads technology to real the auto adjustment of the servo unit device of a compact disk driving device so that the accuracy of reading data is improved. Double dynamic shock suspending (DDSS) system is used to effectively reduce the shock as a compact disk drive rotates with a high speed. Auto balance system (ABS) is used to retain the disk to be horizontal so that the reading ability of the compact disk is improved. Automatic intelligent error correction is used so that the reading amount of a disk is improved greatly. The above said many technologies cause the performance of a compact disk driving drive to be improved. However, current compact disk driving device uses a high rotation speed disk and a laser head of straight and reciprocal movement. The inertial of the disk is too large and the mass of the laser head is large. Therefore, the current used compact disk driving device consumes much power and has a large shock so that the moving range of the disk is confined. For example the current compact disk drive cannot be used in a personal digital assistant (PDA), which has the function of calculation, phone, facsimile, network, etc. These functions can be realized wirelessly. The extra equipment of PDA consumes low power. However, current compact disk drive has a large rotation inertia and the laser head is heavy and thus can not realize the object of lower power consumption.

Moreover, disks are data density, possible achieving to a value of 108 bit/cm$^2$, accordingly, the disk has a small track interval and bit area. The current track interval for CD-ROM is 1.6 µm with a least bit length of 0.83 µm. The track interval for DVD is 0.84 µm with a least bit length of 0.45 µm. To read data precisely, the components of a compact disk drive must have a precision of sub-micron. In general, the reading compact point and the axial shift of a signal-storing plane cannot be over ±1 µm. If this is only achieved by mechanical system, then the system must have a precision of sub-micron, and is work at the same precision, This is almost impossible.

The current compact disk drive uses a servo system for assuring the precision of positioning of a compact disk drive. The servo system is a basic servo system of a compact disk drive. The laser beam can be accurately positioned on a recording surface of a disk so that the optical spot may rotate and shift with the disk and tracks the recording surface automatically. Conventionally, there are many ways for detecting the focusing error of a laser head, such as detect method using beam of light deviated the center of field lens; detect method by refraction of cylindrical lens, detect method by critical angle, etc. In holographic lens, the reading of data and servo signal are performed by holographic elements. The methods for detecting signals are such as spot size detection (SSD). However, current focusing device will perform a straight and reciprocal movement repeatedly as it is installed on a laser head. Since the focus coil is heavy, the straight and reciprocal movement will cause a large instantaneous speed and thus a large electric power is consumed.

SUMMARY OF THE INVENTION

Accordingly, the primary object of the present invention is to provide a lower inertial compact disk driving device wherein in operation, the laser head and the disk are static. A displacing device is used to change the position of the laser beam incident upon a disk. The displacing device has a rotary needle, a rotation-driving device and a displacing device. The rotary needle is installed below the lower side of a written surface of the disk. A center of the rotary needle is installed with a fixed reflector, and selected positions at two sides thereof are installed with a movable reflector and a balance block, respectively. The rotation-driving device is used to control the rotation of the rotary needle and the displacing device is used to control the opposite movement of the balance block and the rotary needle so as to control the change of a data reading optical path.

Another object of the present invention is to provide a lower inertial compact disk driving device, wherein the focus of the laser beam from the laser head is precisely located at the optical recording surface. The light spots tracks the movement of the recording surface so that the recording surface is retained in a range of the focus.

A further object of the present invention is to provide a lower inertial compact disk driving device, wherein a close loop focus control loop is used, and light spot detect method is used to detect servo signal. The focusing servo signal is phase and amplitude compensated and then is amplified so as to drive a focusing device to control the movement of a focusing lens and thus light spots are radiated to a disk precisely.

The various objects and advantages of the present invention will be more readily understood from the following detailed description when read in conjunction with the appended drawing.

BRIEF DESCRIPTION OF THE DRAWINGS

FIG. 4A is a schematic view showing the focusing unit device of the present invention;

FIG. 4B is an enlarged view of E—E of FIG. 4A;

FIG. 4C is an enlarged view of F—F of FIG. 4A; and

DETAILED DESCRIPTION OF THE PREFERRED EMBODIMENT

The disk 20 in the present invention is a storage medium of computer document, which includes an ISO-9660, Romeo, and others.

Figure 1:
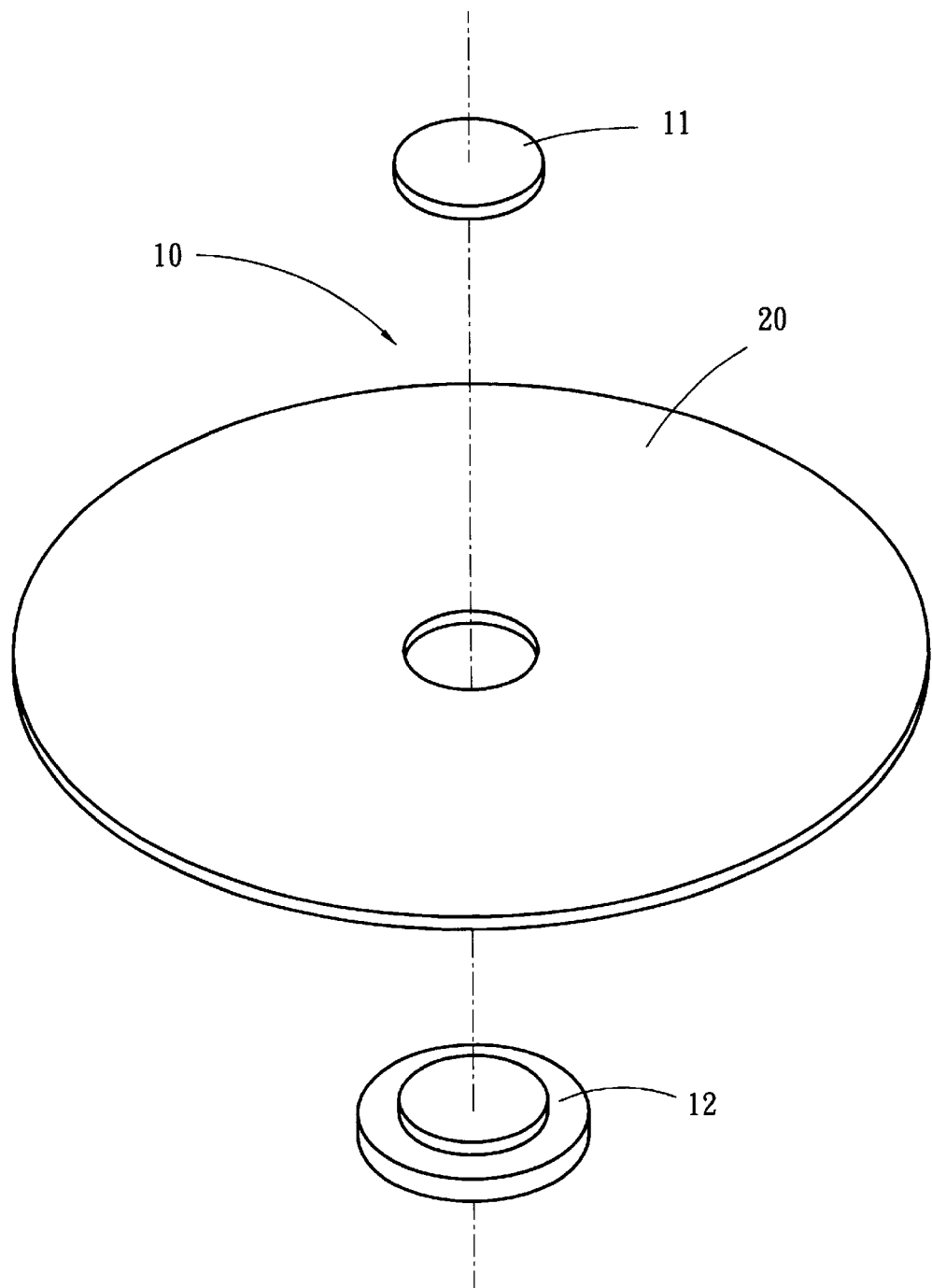
FIG. 1 is a schematic view showing the installation of the disk of the present invention.

The present invention comprises the following elements:

A disk retainer device 10 (referring to FIG. 1) is formed by a disk press 11 and a disk supporter 12. The disk 20 is placed on the disk supporter 12. The disk press 11 presses the disk 20 on the disk supporter 12, thereby; the disk 20 is fixed so that the disk 20 cannot rotate.

Figure 2A:
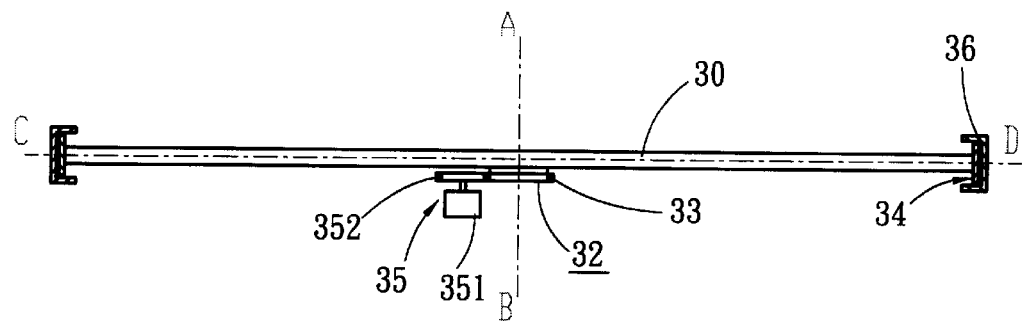
FIG. 2A is a schematic view showing the lateral view of the rotary needle of the present invention.
Figure 2B:
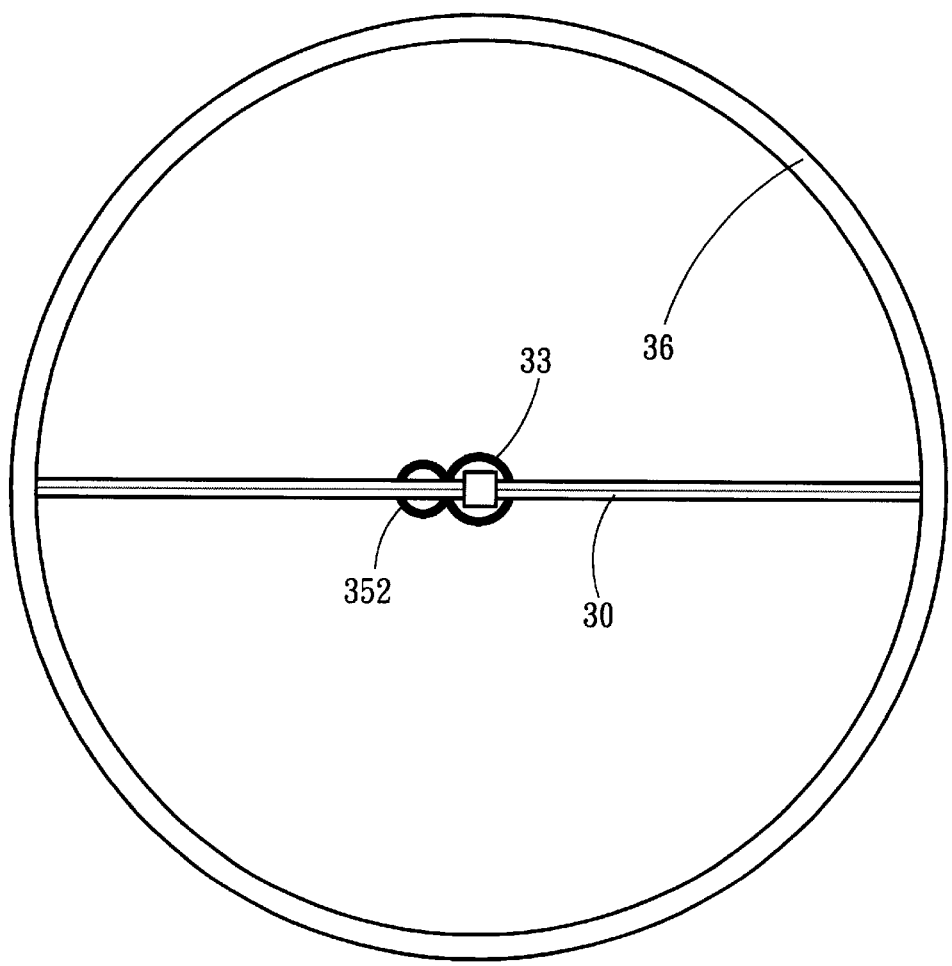
FIG. 2B is a schematic view showing the lateral view of the rotary needle of the present invention.
Figure 3A:
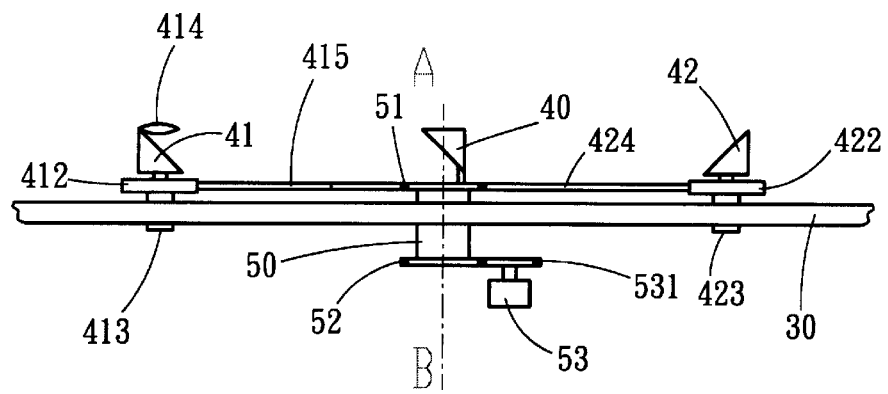
FIG. 3A is a lateral schematic view of the displacing device of the present invention.
Figure 3B:
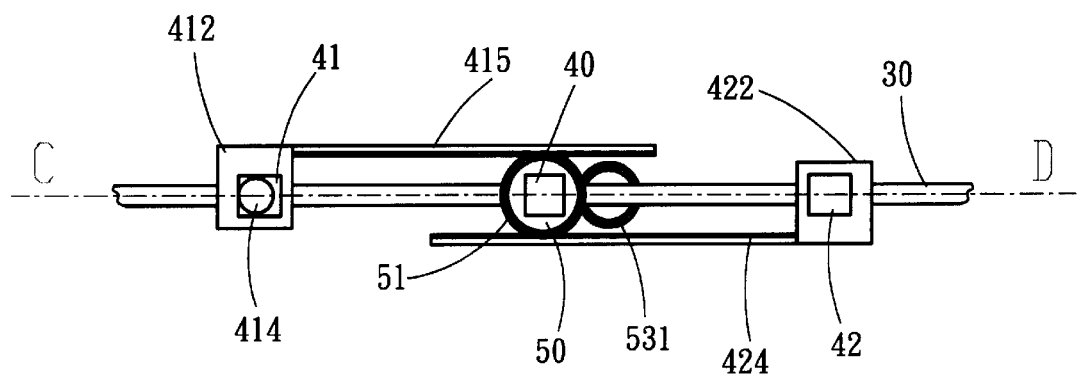
FIG. 3B is an elevational schematic view of the displacing device of the present invention.

A displacing device serves for controlling and change a position that the optical beam emitted from a laser head radiates upon the disk 20. The displacing device includes the following elements:

A rotary needle 30 (referring to FIGS. 2A, 2B) is installed below the written surface of the disk 20 and is a hollow tube with a transversal groove 31 (referring to FIG. 4B). A center of the rotary needle 30 has a hole. The lower side of the hole protrudes with a gear 33 which is linked with the rotary needle 30. The center of the gear 33 is overlapped with the center of the rotary needle 30 for driving the rotary needle 30 to rotate.

Each of two ends of the rotary needle 30 has a respective light-floating wheel 34. The light-floating wheel 34 rotates continuously along the transversal central shaft C-D of the rotary needle 30. As the light-floating wheel 34 rotates, it is in contact with the inner of an annular device 36. The annular device 36 retains motionless for preventing the rotary needle 30 from vibration in high rotation speed so as to control the rotary needle 30 in a proper flexible deformation.

A rotary driving device 35 is combined with a driving motor 351 and a gear 352. The gear 352 is engaged with the gear 33. The driving motor 351 drives the gear 352 to rotate so as to drive the gear 33, so that the rotary needle 30 rotates along the central shaft A-B to rotate continuously.

A set of optical unit device severs as a transfer unit device for transferring the optical beams emitted from the laser head. The optical unit device comprises the following elements:

A fixed reflector 40 is firmly secured to the center of the rotary needle 30 (referring to FIGS. 3A, 3B, 4A, 4B, and 4C).

A movable reflector 41 is firmly secured to a sliding rod 411. The sliding rod 411 passes through a movable plate 412 having a hole and the transversal groove 31 of the rotary needle 30 so as to enter into a rigid sliding track 60. The bottom of the movable plate 412 is extended with a bush 413 covering upon the rotary needle 30.

Moreover, the upper side of the reflector 41 has a focusing lens 414 for focusing laser light.

A balance block 42 serves for retaining the balance of the rotary needle 30 and is firmly secured to the sliding rod 421 of the reflector 41. Similarly, the sliding rod 421 has a movable plate 422 which passes through a hole and the transversal groove 31 of the rotary needle 30 so as to enter into a rigid sliding track 60. The bottom of the movable plate 422 is extended with a bush 423 covering upon the rotary needle 30.

Each side of the two movable plates 412 (422) has a rack 415 (424) which are placed at two lateral sides of the balance block 42 of the reflector 41.

A displacing device (referring to FIGS. 3A, 3B) comprises the following elements:

A hollow driving unit device 50 is firmly secured to the inner edge of the hole 32 of the rotary needle 30. The upper and lower ends further are installed with gears 51, 52. The upper gear 51 is engaged with the two racks 415, 424.

A servo motor 53 is engaged with a gear 531 which is further engaged to the lower gear 52 below the hollow driving unit device 50 for driving the reflector 41 and the balance block 42 to move straightly.

A servo motor 53 drives the gear 531 to drive the gear 52 at the lower end of the hollow driving unit device 50 to rotate so that the upper gear 51 of the hollow driving unit device 50 drives the two racks 415, 424 to move. Therefore, the racks 415, 424 moves oppositely along a straight line so as to drive the movable reflector 41, focusing lens 414 and balance block 42 to move straightly along the C-D direction reciprocally. That is the moving direction of the balance block 42 is oppositely to the movable reflector 41 so as to retain the balance of the rotary needle 30. Therefore, the rotary needle 30 may retain in a dynamic balance as it rotates in a high speed. Since the fixed reflector 40 is firmly secured to the center of the rotary needle 30, it only rotates with the rotary needle 30 with a high speed so as to retain a respective angle between it and the reflector 41.

A focusing device (referring to FIG. 4A) serves for driving the movable reflector 41 of the optical unit device, and the focusing lens 414 to move slightly upwards and downwards. As a consequence the optical spot can precisely radiate upon the disk. The focusing device has the following elements.

Two rigid sliding tracks 60 are installed in the interior of the rotary needle 30 as moving tracks of the movable reflector 41 and the balance block 42 and as a linkage for controlling the upward and downward displacement. One end of each of two rigid sliding tracks 60 is installed to a focusing coil 61, and another end thereof is engaged to the reflector 41 and the sliding rods 411, 421 of the balance block 42.

In the enlarged cross sectional view along E—E of FIG. 4, the rigid sliding tracks 60 has a "C" shape structure. The upper ends of the sliding rods 411, 421 have inverse "T" shape structures which are matched to "C" shape structure. Therefore, the sliding rods 411, 421 is slidable in the rigid sliding tracks 60 and is driven by the rigid sliding tracks 60. The contact surface between the rigid sliding tracks 60 and the sliding rod 411 is smooth and thus has a small friction. Similarly, the balance block 42 and the sliding rod 421 have similar structures.

A focus coil 61 as the enlarged view illustrated in F—F of FIG. 4C is installed to the periphery of the hollow driving unit device 50 of the rotary needle 30. Four springs 62 are installed at the lower side of the focus coil 61, which are symmetrically distributed along the axis of the focus coil 61. Each spring 62 has one end being connected to the focus coil 61, and another end thereof is firmly secured to a bottom of the rotary needle 30. When the focus coil 61 has no current, the spring 62 is in a balance condition and the focus coil 61 is in a center of a rotary needle 30. When current flows through the focus coil 61, the magnetic field of the focus coil 61 is interacted with the spring 62 to move upwards and downwards.

Two permanent magnets 63 are installed the upper and lower side of the rotary needle 30 with respect to the focus coil 61. The permanent magnets 63 have holes 631. Thereby, the optical beam from a laser head can pass through the holes to the fixed reflector 40.

Figure 5:
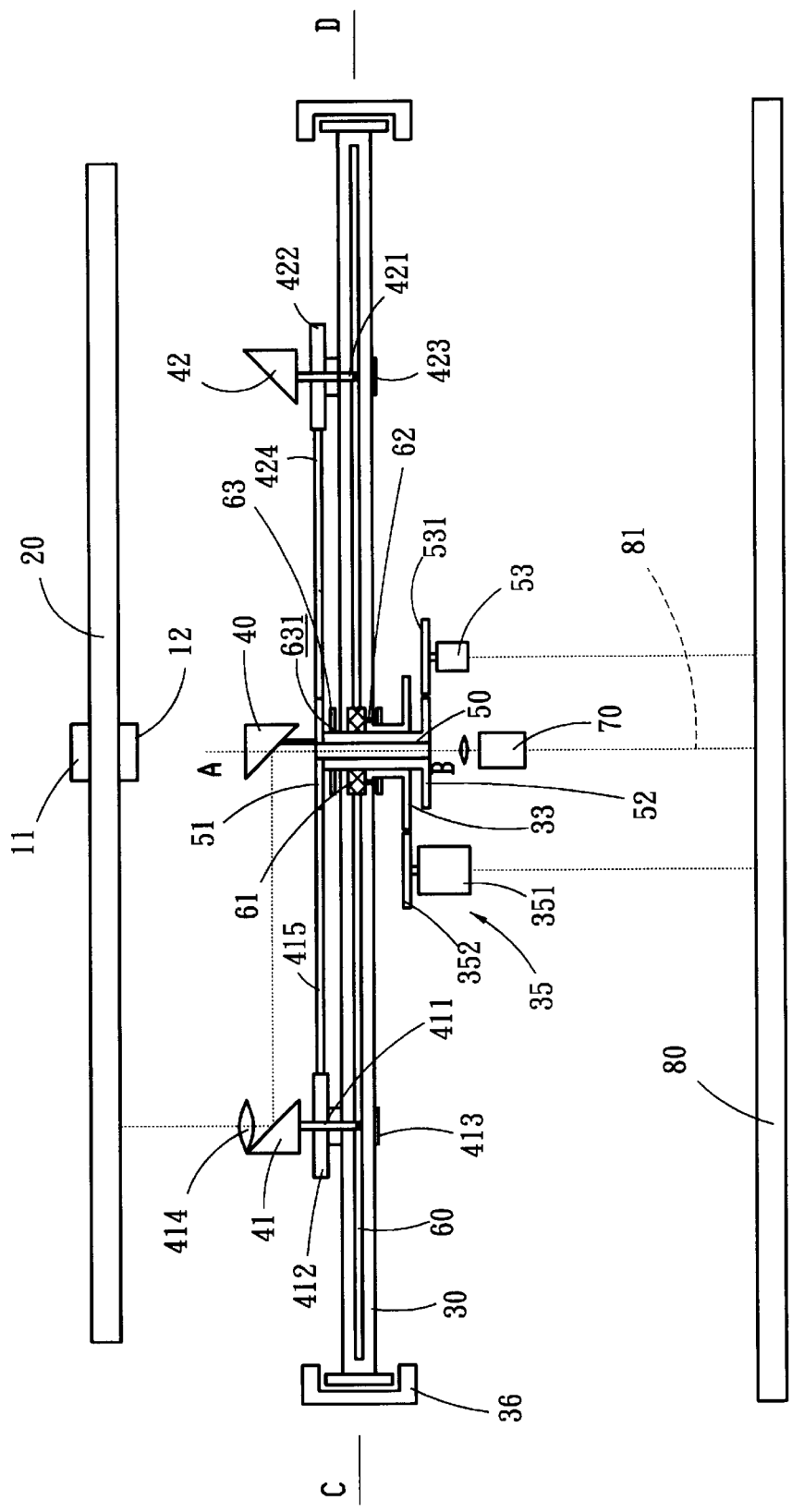
FIG. 5 is a schematic view showing one embodiment of the present invention.

Referring to FIG. 5, the structural schematic view of the present invention is illustrated, which are assembled schematic view of FIGS. 2 to 4. The disk 20 is placed on the disk supporter 12 and then the disk press 11 is locked to the disk 20. When a compact disk drive begins to work, the rotary needle 30 is driven by the rotary driving device 35 to rotate so that the engaged gears 33 and 352 rotate along the center axis A-B in a high speed. At this time, the optical unit device and the displacing device will rotate with a high speed with the rotary needle 30. The focusing device in the rotary needle 30 rotates synchronously. Meanwhile, the movable reflector 41 and the balance block 42 reciprocally move leftwards and rightwards (along C-D direction) on the rotary needle. At this time, the whole rotation unit device is in a balance state. The fixed reflector 40 rotates with the rotary needle 30 synchronously with a high speed so as to retain the respective angle with respect to the movable reflector 41. Thus the optical beam from the laser head 70 passes through the fixed reflector 40 and is reflected to the movable reflector 41. Then the beam is focused to a track on the disk 20 by the focusing lens 414. Each beam reflected from the reflected layer of the disk 20 passes through the focusing lens 414, movable reflector 41 and fixed reflector 40 sequentially and then is received by the laser head 70. When the rotary needle 30 rotates with a high speed, and the reflector 41, focusing lens 414, and the balance block 42 move reciprocally along a straight line, the incident angle of the optical beam from the laser head 70 entering into the fixed reflector 40 is retained. Similarly, the incident angle that the beam is reflected by the fixed reflector 40 and then incidents into the movable reflector 41 is also remained. Each beam reflected by the reflecting layer of the disk 20 is received by the laser head 70 along an optical path. Then the beam is transferred to a control circuit board 80 for further processing.

Moreover, as the gears 33, 352 drives the rotary needle 30 to rotate with a high speed, the concentric hollow driving unit device 50 of the gear 33 is not affected. Since the gear 33 and gear 352 are matched, the friction between is very small. Therefore, as the gear 33 drives the movable reflector 41 and the balance block 42, the gear 33 will not be affected.

The straight and reciprocal movement of the reflector 41 and the balance block 42 are driven by the displacing device. The servo motor 53 drives the gear 51 and gear 52 Thereby, the gear 531 and the racks 415, 424 so that the rotation of the servo motor 53 is converted into the synchronously straight and reciprocal movement of the reflector 41 and balance block 42. At the time that the movable reflector 41 moves, the balance block 42 adjusts to a reverse direction for assuring the dynamic balance of the rotary needle 30. The light floating wheels at two ends of the rotary needle 30 rotates continuously along the C-D axis. The outer edge of the light-floating wheel 34 is in contact with the inner wall of the annular device 36 for preventing the rotary needle 30 from a large vibration as rotating with a high speed. Meanwhile, the rotary needle 30, movable reflector 41, fixed reflector 40 and balance block 42 have streamline shapes for reducing the resistance as rotates with a high speed.

A process of focusing will be described in the following. The focusing error photoelectric detector (not shown, while it is the same as the current used one) is used detect a compound signal containing focusing error signal. The signal is compared wit the focusing error preset value. After being processed by the focusing error processing circuit in the control circuit board 80, the signal is enlarged and then well focusing error signal is separated and is amplified. Then through an adjusting algorithm, a focusing driving voltage is outputted. Then the signal power is amplified through a driving circuit to be further applied to the focus coil 61. Then a focus coil 61 generates a magnetic field which is interacted with the magnetic field of two permanent magnets 63 so that the focus coil 61 moves upwards and downwards. Thereby, the rigid sliding tracks 60 is driven to move up and down. Then, the two sliding rods 411, 421 connected to the rigid sliding tracks 60 is driven to move up and down. As a result, the focusing lens 414 moves up and down for focusing. Meanwhile, the upward and downward movement of the balance block 42 assures the dynamic equilibrium of the rotary needle 30.

The circuit and chip for controlling the focusing signal is the same as the processing circuit used in the control of the laser head focusing lens of current optical disk driving technology.

Besides, the control circuit board 30 used in the present invention is that used in the prior art. The circuit for controlling the disk 20 in the prior art circuit is used to control the rotation of the rotary needle 30. The circuit in the original circuit board for controlling laser head 70 and other components for controlling the straight and reciprocal movement are used to control the straight and reciprocal movements of the rotary needle 30 and the movable reflector 41. No new technology about control circuits and control chips are desired to be developed. Thereby, the cost is low in the present invention.

In summary, in the present invention, the disk and laser head are static and optical unit device are used as a lower inertial compact disk driving device as a medium of the laser optical path. Furthermore, the focusing is realized. Moreover, the present invention is light and easily controlled, and has a simple structure and lower cost. The defect of larger power consumption of the prior art is improved.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A lower inertia compact disk driving device comprising:

a displacing device having a rotary needle that controls rotation of an optical unit device, the displacing device also controls straight and reciprocal movement of the optical unit device for changing the position of incidence of a laser beam on a disk, said optical unit device is installed in the rotary needle as a transfer unit device for transferring the laser beam from the laser head, and a focusing device for driving the optical unit device to move slightly so that light contacts the disk precisely.

2. The lower inertia compact disk driving device as recited in claim 1, wherein:

the rotary needle is installed at a lower side of the disk and has a transverse groove and a hole at a center thereof, a lower side of the hole receives a gear that is integral to the rotary needle.

3. The lower inertia compact disk driving device as recited in claim 2, wherein:

rotation of the rotary needle is controlled by a rotation driving device that includes a driving motor and a gear, the gear being engaged with the gear integral to the rotary needle.

4. The lower inertia compact disk driving device as recited in claim 2, wherein:

the displacing device comprises:

a hollow driving unit device installed at an inner edge of the hole, upper and lower ends of the driving unit device including gears, a gear at the upper end of the driving unit device being engaged with the two racks, and a servo motor engaged with a gear which is engaged with a lower gear of the hollow driving unit device to drive the movable reflector and the balance block to move in a straight and reciprocal motion.

5. The lower inertia compact disk driving device as recited in claim 1, wherein:

two ends of the rotary needle have light floating wheels that rotate continuously along the transverse central axis of the rotary needle.

6. The lower inertia compact disk driving device as recited in claim 5, wherein:

the rotary needle rotates on, and is in contact with, an annular device.

7. The lower inertia compact disk driving device as recited in claim 1, wherein:

the optical unit device comprises:

a fixed reflector firmly secured to a center of the rotary needle, a movable reflector having a focusing lens for focusing the laser beam at a predetermined angle, and a balance block installed on the movable reflector to maintain balance of the rotary needle.

8. The lower inertia compact disk driving device as recited in claim 7, wherein:

two sliding rods have a "T" shape and pass through a movable plate and the transverse grooves of the rotary needle to enter into rigid sliding tracks.

9. The lower inertia compact disk driving device as recited in claim 8, wherein:

bottoms of the two movable plates have bushings which are engaged with the rotary needle.

10. The lower inertia compact disk driving device as recited in claim 7, wherein:

two movable plates are installed in racks which are formed at opposite sides of the movable reflector and the balance block.

11. The lower inertia compact disk driving device as recited in claim 1, wherein:

the focusing lens comprises:

two rigid sliding tracks installed in an interior of the rotary needle that serve as moving tracks of a movable reflector and a balance block and as a linkage to control upward and downward displacement, one end of each of the two rigid sliding tracks is connected to a focusing coil, and another end of each of the two rigid sliding tracks is engaged with the reflector and sliding rods of the balance block, and a focus coil installed at a periphery of a hollow driving unit device of the rotary needle; wherein interaction of a magnetic field generated by the focus coil and a magnetic field of two permanent magnets causes upward and downward displacement of the focus coil so that the rigid sliding tracks are driven to move up and down, thereby focusing the movable reflector in real time.

12. The lower inertia compact disk driving device as recited in claim 11, wherein:

a lower side of the focus coil has four springs that provide a restoring force to the focus coil.

13. The lower inertia compact disk driving device as recited in claim 11, wherein:

the rigid sliding tracks have a "C" shape.

\* \* \* \* \*